3,001,583
PROCESS OF DRILLING AND TREATING WELLS
Michael J. Nevins and Earl E. Huebotter, Houston, Tex., assignors to National Lead Company, New York, N.Y., a corporation of New Jersey
No Drawing. Filed Nov. 26, 1957, Ser. No. 698,932
10 Claims. (Cl. 166—30)

This invention relates to processes of treating or drilling wells, wherein escape of fluid to subterranean formations is prevented, and more particularly to improved processes whereby sealing action is removable at will.

In many operations involving drilling of wells for oil, gas, sulphur, and the like, wherein a fluid is used for or in connection with the drilling operation, or in various treatments in the well such as fracturing, cementing, formation treatment, such as acidizing, water block removal, and the like, it is necessary to prevent the gross passage of the fluids in the well into the formation. This may take place and commonly does where the formations are fractured, gravelly, cavernous, or subject to parting by hydrostatic pressure, as in squeezing, cementing and fracturing operations. While in general fluids such as drilling fluids and perforating fluids, when contained in a well with open formations exposed therein, are subject to filtration of the liquid phase thereof into formations which may be permeated by a liquid, this being a type of filtration, the problem with which the present invention is concerned is that of the loss of fluid as a whole to fractured, gravelly and the like, formations. Such loss is frequently encountered during drilling, where it has received the name of "lost circulation," inasmuch as the drilling fluid does not return to the surface, and thus normal circulation cannot be maintained. An entirely similar action takes place in the other instances mentioned, other than strictly drilling operations, where a fluid placed in the hole for some special purpose does not remain there as intended, but disappears to a greater or less extent into formations adjacent the hole.

It has become common practice to add various fragmented fibrous, flaky, vesicular, granulated, and the like materials to fluids to be circulated in or placed in a well with the object in view of having such comminuted materials seal off against the fissures, gravely interstices, and the like, which would otherwise accept the fluid. Such lost circulation additives are, for example, chopped rope, mica, asbestos, cotton fibers, cellophane flakes, and a host of other like materials, almost too numerous to mention. A recent review of the problem was given by R. J. White in a paper delivered at the Los Angeles meeting of the Pacific Coast District of the Production Division of the American Petroleum Institute, May 1956, entitled "Lost Circulation Materials and Their Evaluation."

Unfortunately, the seal obtained with such materials often persists long after the immediate need therefor has passed, and it is not uncommon for oil-bearing formations to be plugged by the previous use of such sealing materials, so that their productivity for oil and gas is reduced in part or altogether. Wall-scraping and underreaming operations are frequently of little avail in breaking such an unintended seal, particularly when the formation was of such a character that it accepted the sealing material in depth, as so frequently happens in limestone, breccia, and the like formations.

An object of the present invention is to provide a process for reversibly sealing against lost circulation.

Another object of the invention is to provide a fluid and process of using same, whereby said fluid may be maintained in a well without loss thereof to the formation but readily removed and the sealing action thereof removed at any desired later stage of the well treatment.

Other objects of the invention will appear as the description thereof proceeds.

Generally speaking, and in accordance with an illustrative embodiment of the invention, a fluid to be used in a well subject to loss into a given stratum therein is provided with a fragmented substance in suspension therein which has the property of having both a solid form and insolubility in petroleum hydrocarbons below a temperature which is characteristic of the substance in question, but also the property of dispersing and/or dissolving in petroleum hydrocarbons above the characteristic temperature. The suspension described is utilized in the well for whatever purpose desired, such as drilling, chemical treatment, fracturing, acidizing, and the like, at a temperature below the characteristic temperature mentioned. Thereafter, when the operation of drilling, chemical treatment, or the like is completed, with respect to the stratum in question, or at a later time, the well temperature at the depth of any such stratum is raised by well-known means, generally termed in the oil drilling and producing industry as bottom hole heaters, to a temperature higher than said characteristic temperature, so that where the stratum in question contains a petroleum hydrocarbon, the fragmented substance disperses therein. In order to assist the dispersion or dissolving action, the stratum may be contacted with a petroleum hydrocarbon fluid introduced for that purpose, or it may of course have been the fluid originally used in performing the sealing operation in the first place.

For the sake of simplicity, the subterranean formations, strata, and the like which are capable of accepting fluid in the manner described will be designated as "invadable."

The fluid used for drilling or any other desired operation in the well may be any of a wide variety of liquids, such as aqueous drilling fluids of both oil-in-water or water-in-oil type, oil-base drilling muds, aqueous foam drilling fluids, and the like. Where the purpose of the fluid is not precisely that of a rotary drilling fluid, but is used for such purposes as fracturing, cementing, perforating, acidizing, and the like, the fluid may be oil or water or emulsions thereof, suspensions of various materials in oil and water, such as clay in water, asphalt in oil, and the like. All the fluids and muds of the type described are well known in the art and need not be set forth in greater detail herein. The fluid may also be air or other gas as described below.

The fragmented substance used in accordance with this invention is a material in particulate form, such as granules, flakes, fibrils, and the like, formed from a material which as mentioned is solid as distinguished from liquid at temperature below a characteristic dispersing temperature in the presence of a petroleum hydrocarbon, and at the same time is insoluble or undispersible in a petroleum hydrocarbon at and below a certain characteristic dispersing temperature, but on the other hand has the property of dissolving or dispersing in petroleum hydrocarbons at higher temperatures. The petroleum hydrocarbons in accordance with this invention are, in the first place, the crude oils themselves which may be present in the formations penetrated by the well bore, or in the second place, they may be crude oil or various fractions thereof, such as topped crude, diesel fuel, fuel oil, kerosene, and various other distillate fractions from crude petroleum oil, introduced in to the well either as a component of the drilling of treating fluid at the time the particulate substance is used as a seal in the well, or at such later time as the temperature is raised as has been described, so as to furnish a fluid medium for the particulate substance to disperse or dissolve in. Numerous examples of such substances will be given below.

In some cases it is difficult to state whether the action of the petroleum hydrocarbon containing the particulate substance at temperature higher than the characteristic dispersing temperature is one of dispersion or dissolution or both. The end result is the same in all cases, however, and is namely that the mixture of the particulate substance used and the petroleum hydrocarbon becomes a single phase to the eye.

We have found a number of substances to be suitable for carrying out the invention as described herein. Generally speaking, these materials are organic polymers, and of these we have found polyethylene to be the most suitable and at the same time the most readily available. Other materials are polypropylene and polystyrene.

As has been mentioned, these substances may be used in a variety of fragmented forms, which include granules, particularly a granulation embracing a range of particle sizes, as from about 20 mesh to about 6 mesh; fibers which may be of variable thickness, but preferably small enough in diameter so that they are quite flexible, and again of a range of lengths, such as for example from about ¼ inch to about 1 inch; and fragmented shapes formed from the material in sheet form, particularly of a thickness of ½ to 2 or 3 thousandths of an inch, i.e., 0.005" to about 0.003". Where the material is manufactured from such a sheet, it can be in ribbon form, such as approximately ¼ inch by 1 inch, or it may be a random mixture of relatively isodimensional flakes as produced in a hammer mill. The best material which we have found is made by fragmenting polyethylene in sheet form of about 0.001" thickness in a high speed hammer mill so as to produce curled, ragged fragments of average dimensions in the plane of the sheet of from about ⅛ inch to about 1 inch. It will be appreciated that in such a hammer milling operation a considerable range of sizes is produced even at a single setting of the mill, because of the random nature of the tearing and disintegrating action. We have used with substantially equally effective results a Williams hammer mill, made by the Williams Patent Crusher and Pulverizer Company and fitted with Ideal type hammers and a 1 inch opening screen, and a Rietz disintegrator of the angle type made by the Rietz Manufacturing Company, with a ⅜ inch opening screen. These mills are described in the Chemical Engineering Catalog 1956-57, published by Reinhold Publishing Corporation, New York 1956, on pages 1854-5 and 1566 respectively.

We prefer materials having their characteristic dispersing temperature as explained hereinabove in the general range of approximately 130° F. to about 400° F. It will be appreciated that a suitable characteristic dispersing temperature will vary greatly from well to well, and indeed from one depth to another in the same well, keeping in mind the fact that well temperatures invariably increase with greater depth. In general, where an invadable stratum at a shallow depth, for example 500 to 1000 feet, is involved, a low characteristic dispersing temperature of the fragmented substance will be most suitable, as it will then not be necessary to expend any more than a minimum of heat energy in the second stage of the process wherein the fragmented substance is caused to dissolve and/or disperse in the hydrocarbon liquid. On the other hand, the bottom hole temperature, even the circulating bottom hole temperature as distinguished from the shut-in temperature, may be as high as 250° F. or 300° F. in a deep well, such as for example 10,000 or 15,000 feet in depth, and it will in general be necessary to employ a fragmented substance having a characteristic dispersing temperature in excess of the hottest transient temperatures encountered during the protection of the invadable stratum concerned. Fortunately, a wide range of characteristic dispersing temperatures is available in the materials which we have employed and teach herein. For example, polyethylene is currently manufactured by a variety of basic processes, resulting in the availability of polyethylene with characteristic dispersing temperatures all the way from somewhat below 150° F. to as high as 300° F. and even higher for some of the most recent processes which have been developed. Polypropylene is available in sheet form from the Montecatini firm in Milan, Italy, and as made by them has substantially higher characteristic dispersing temperatures than polyethylene. Polystyrene in general has a higher range of characteristic dispersing temperatures than polyethylene, depending somewhat of course upon the conditions obtaining during polymerization. One widely available polystyrene in sheet form, manufactured by the Monsanto Chemical Company and sold under the trade name "Polyfax," has a characteristic dispersing temperature of 300° F. to 310° F. It will be apparent to those skilled in polymer chemistry that other organic polymers having comparable chemical structures will have the same mechanical and thermal properties as those which have been named and described herein, and to the extent that they have essentially the same behavior as those described, may be considered as equivalents for the purposes of this invention.

We have found that two test methods are applicable to the practice of our invention. The characteristic dispersing temperature is readily found by putting a minor proportion in a glass beaker with the petroleum hydrocarbon fluid and raising the temperature slowly while at the same time observing the material and the temperature of the mixture. This may be conveniently done by stirring with a thermometer. In general, rather sharply defined characteristic dispersing temperatures will be found for materials coming within the scope of the invention.

The relative effectiveness of any given fragmented substance in bringing about a seal with any given placement or drilling fluid may conveniently be determined by substituting for the filter paper and screen of the drilling mud filtration testing apparatus, standardized by the American Petroleum Institute and described in their code No. 29, a metal diaphragm having a slit preferably variable in width. The modified filtration cell is filled with the liquid to be tested containing the fragmented substance and pressure applied as described in the API code. By arranging for the cell to be immersed in a heating bath, whereby the temperature of the whole apparatus can be slowly raised, the temperature at which the seal breaks may also be determined. We have found that this temperature coincides within experimental error with the dissolution temperature, as determined by the beaker method, just described, which is the characteristic dispersing temperature as explained and defined hereinabove and as used in the claims which follow.

Mention has been made of the use of the invention in connection with fracturing. It is especially adapted to clean-out operations following fracturing, in which the excess sand used in the latter process accumulates in the well and must be removed. This is generally accomplished by circulating a suitable fluid, which may be an ordinary drilling fluid of the type described. Under these circumstances, it is especially necessary that the clean-out fluid which is used should not invade the fractures, since these are the very channels through which the oil is intended to flow into the well when the latter is placed on production. By the use of our invention, in which a fragmented substance is incorporated in the clean-out fluid, the fragmented sealing material can be entirely removed at the conclusion of the clean-out operation by heating, as has been described.

While the placement or drilling fluid used in the stage of the inventive process wherein fluid entry into invadable strata is prevented will in general be a liquid, our invention is also applicable to air and gas drilling fluids, which have come into increasing use in the last few years. In this method of drilling, instead of circulating a liquid through the drill pipe, a gas such as air or hydrocarbon gas produced from nearby wells is used. One difficulty with this method of drilling is that water intrusion into the hole interferes with the proper removal of the cuttings and causes them to remain in the hole where they impede the course of the drilling. One way of overcoming this is to raise the pressure to a high enough level that the fluid pressure of the formation water is matched or exceeded. This in turn often leads to loss of the air or gas into invadable strata. By using fragmented substances in accordance with this invention, and here the very thin fragmented flake material is especially recommended, since it is so readily carried through the circulating system by air or gas, loss of the latter to invadable formations is prevented. At the conclusion of the drilling operation or any selected stage thereof any oil or gas bearing strata against which a seal has been placed may be readily cleaned up and freed of the sealing material by the application of heat in accordance with the invention.

As has been mentioned, a variety of heating means may be employed, the transmittal of heat energy from the surface to the stratum to be treated being by electricity, by the circulation of hot liquids such as water or oil, or by the circulation of hot gases such as steam. The invention is not dependent upon any one method of heating, as the choice of the latter will generally be determined by the economics of a particular situation. It is to be expected that heating devices dependent upon fissionable materials will eventually become available for bottom hole heating. The devices in current use in American oil fields are described in two articles in the Oil and Gas Journal, June 24, 1957, pages 142–161; and July 1, 1957, pages 119–127.

An illustrative example in addition to those already given hereinabove follows:

Polyethylene film of thickness 0.0012" to 0.0015" was passed through a Rietz angle disintegrator, using a ⅜" square screen opening. The product was added to a blended oil, made up of two parts by volume Bunker No. 6 and one part by volume diesel No. 2. A drilling fluid was made up of this oil, in which were admixed 15 lbs. per barrel of the polyethylene product described. A test was made on the modified API apparatus described, with the slit opening at 0.05". At 100 p.s.i. pressure a seal was formed in 20 seconds with a shut-off volume of 67 ml. When the temperature of the apparatus was raised to approximately 155° F., the seal broke. The characteristic dispersing temperature by the beaker test was the same within the experimental error of measurement which was about plus or minus 5° F.

The drilling fluid prepared as described in the above paragraph is used for drilling in a shallow pressure-depleted producing zone subject to loss of circulation, and having a shut-in bottom hole temperature of 125° F. After drilling of the zone is completed, a perforated liner is set therein, and the drilling fluid above the producing zone removed. An electric type bottom hole heater is run into the liner, and the invadable producing stratum adjacent the well is heated through the liner, the fluid therein acting as a heat-transfer medium, to a temperature of appropriately 180° F. The well is then swabbed, and the polyethylene flakes are in complete solution and are carried by the oil produced from the formation not only away from the walls of the bore hole and from within the gravelly interstices therein, but also through the slots in the liner, so that the clean-up is complete.

It is to be emphasized that the fragmented substance used in accordance with this invention must be of the type described and having the properties set forth hereinabove. For example, substances which soften, dissolve, and disperse in petroleum hydrocarbon fluids even while in their solid form and even while at room temperature will clearly not be operative in the process of the invention, as delineated in the claims. Examples of such inoperative substances, because of their property of dissolution at room temperatures, are both refined and natural asphalts, including such materials as gilsonite, unvulcanized rubber, gutta percha, rosin, and many similar materials. Further, as is well-known in the drilling art, the comminuted material must contain particles of a size larger than that of the openings in the invadable stratum in order that a seal may form.

It is to be noted that while the invention has been described with the aid of specific samples, numerous modifications in materials and procedures may be made within the spirit of the invention and the scope of the claims which follow.

Having described the invention, we claim:

1. A process of treating a well having an exposed invadable stratum therein, comprising the steps of introducing into said well opposite said invadable stratum a carrier fluid carrying in suspension therein a fragmented substance in solid, undissolved form having a particle size larger than the openings of said invadable stratum and further having the property of possessing solid form insoluble in a petroleum hydrocarbon mixture consisting of two parts Bunker No. 6 fuel oil and one part diesel No. 2 oil below a characteristic dispersing temperature but dispersible in said mixture above said characteristic dispersing temperature, said introduction of said carrier fluid being at a temperature less than said characteristic dispersing temperature, permitting said carrier fluid with its said fragmented substance to remain opposite said exposed invadable stratum for a period of time sufficient to permit the sealing of said stratum by said fragmented substance; thereafter contacting the said fragmented substance with a hydrocarbon fluid; and thereafter applying heat to said exposed invadable stratum so as to raise its temperature above said characteristic dispersing temperature.

2. A process of treating a well having an exposed invadable stratum therein, comprising the steps of introducing into said well opposite said invadable stratum a liquid hydrocarbon carrier fluid carrying in suspension therein a fragmented substance in solid, undissolved form having a particle size larger than the openings of said invadable stratum and further having the property of possessing solid form insoluble in a petroleum hydrocarbon mixture consisting of two parts Bunker No. 6 fuel oil and one part diesel No. 2 oil below a characteristic dispersing temperature but dispersible in said mixture above said characteristic dispersing temperature, said introduction of said carrier fluid being at a temperature less than said characteristic dispersing temperature, permitting said carrier fluid with its said fragmented substance to remain opposite said exposed invadable stratum for a period of time sufficient to permit the sealing of said stratum by said fragmented substance; and thereafter applying heat to said exposed invadable stratum so as to raise its temperature above said characteristic dispersing temperature.

3. A process of treating a well having an exposed invadable stratum therein, comprising the steps of introducing into said well opposite said invadable stratum a carrier fluid carrying in suspension therein a fragmented substance in solid, undissolved form having a particle size larger than the openings of said invadable stratum and further having the property of possessing solid form insoluble in a petroleum hydrocarbon mixture consisting of two parts Bunker No. 6 fuel oil and one part diesel No. 2 oil below a characteristic dispersing temperature but dispersible in said mixture above said characteristic dispersing temperature, said introduction of said carrier fluid being at a temperature less than said characteristic dispersing temperature, permitting said carrier fluid with its said fragmented substance to remain opposite said exposed invadable stratum for a period of time sufficient to permit the sealing of said stratum by said fragmented substance; thereafter removing said carrier fluid from said well, thereafter replacing said fluid with a hydrocarbon fluid, and thereafter applying heat to said exposed invadable stratum so as to raise its temperature above said characteristic dispersing temperature.

4. A process of treating a well having an exposed invadable stratum therein, comprising the steps of introducing into said well opposite said invadable stratum a carrier fluid carrying in suspension therein a fragmented substance in solid, undissolved form chosen from the group of substances consisting of polyethylene, polypropylene, and polystyrene, and having a particle size larger than the openings of said invadable stratum and further having the property of possessing solid form insoluble in a petroleum hydrocarbon mixture consisting of two parts Bunker No. 6 fuel oil and one part diesel No. 2 oil below a characteristic dispersing temperature but dispersible in said mixture above said characteristic dispersing temperature, said introduction of said carrier fluid being at a temperature less than said characteristic dispersing temperature, permitting said carrier fluid with its said fragmented substance to remain opposite said exposed invadable stratum for a period of time sufficient to permit the sealing of said stratum by said fragmented substance; thereafter contacting the said fragmented substance with a hydrocarbon fluid; and thereafter applying heat to said exposed invadable stratum so as to raise its temperature above said characteristic dispersing temperature.

5. The process as claimed in claim 4 wherein the substance is polyethylene.

6. The process as claimed in claim 4 wherein the substance is polyethylene of thickness within the approximate range of 0.0005 inch to 0.003 inch.

7. A process of treating a well having an exposed invadable stratum therein, comprising the steps of introducing into said well opposite said invadable stratum a carrier fluid carrying in suspension therein a fragmented substance in solid, undissolved form chosen from the group of substances consisting of polyethylene, polypropylene, and polystyrene, and having a particle size larger than the openings of said invadable stratum and further having the property of possessing solid form insoluble in a petroleum hydrocarbon mixture consisting of two parts Bunker No. 6 fuel oil and one part diesel No. 2 oil below a characteristic dispersing temperature but dispersible in said mixture above said characteristic dispersing temperature, said introduction of said carrier fluid being at a temperature less than said characteristic dispersing temperature, permitting said carrier fluid with its said fragmented substance to remain opposite said exposed invadable stratum for a period of time sufficient to permit the sealing of said stratum by said fragmented substance; thereafter removing said carrier fluid from said well, thereafter contacting said fragmented substance with a hydrocarbon fluid; and thereafter applying heat to said exposed invadable stratum so as to raise its temperature above said characteristic dispersing temperature.

8. The process as claimed in claim 7 wherein the substance is polyethylene.

9. A process of treating a well having an exposed invadable stratum therein, comprising the steps of introducing into said well opposite said invadable stratum a carrier fluid carrying in suspension therein a fragmented substance in solid, undissolved form chosen from the group of substances consisting of polyethylene, polypropylene, and polystyrene, and having a particle size larger than the openings of said invadable stratum and further having the property of possessing solid form insoluble in a petroleum hydrocarbon mixture consisting of two parts Bunker No. 6 fuel oil and one part diesel No. 2 oil below a characteristic dispersing temperature but dispersible in said mixture above said characteristic dispersing temperature, said introduction of said carrier fluid being at a temperature less than said characteristic dispersing temperature, permitting said carrier fluid with its said fragmented substance to remain opposite said exposed invadable stratum for a period of time sufficient to permit the sealing of said stratum by said fragmented substance; thereafter removing said carrier fluid from said well, thereafter replacing said fluid with a hydrocarbon fluid, and thereafter applying heat to said exposed invadable stratum so as to raise its temperature above said characteristic dispersing temperature.

10. The process as claimed in claim 9 wherein the substance is polyethylene.

References Cited in the file of this patent

UNITED STATES PATENTS

| | | |
|---|---|---|
| 2,502,191 | Williams | Mar. 28, 1950 |
| 2,734,861 | Scott et al. | Feb. 14, 1956 |
| 2,799,341 | Maly | July 16, 1957 |
| 2,801,699 | Sayre et al. | Aug. 6, 1957 |